US011668272B2

(12) United States Patent
Dale et al.

(10) Patent No.: US 11,668,272 B2
(45) Date of Patent: Jun. 6, 2023

(54) CRANKCASE MOUNTS AND REINFORCED RUBBER IN MOUNT ON FORCE VECTOR

(71) Applicant: Polaris Industries Inc., Medina, MN (US)

(72) Inventors: Chad A. Dale, Roseau, MN (US); Lawrence J. Hosaluk, Roseau, MN (US)

(73) Assignee: Polaris Industries Inc., Medina, MN (US)

( * ) Notice: Subject to any disclaimer, the term of this patent is extended or adjusted under 35 U.S.C. 154(b) by 499 days.

(21) Appl. No.: 16/834,355

(22) Filed: Mar. 30, 2020

(65) Prior Publication Data

US 2020/0224628 A1 Jul. 16, 2020

Related U.S. Application Data

(62) Division of application No. 15/723,884, filed on Oct. 3, 2017, now Pat. No. 10,619,615.

(51) Int. Cl.
*F02N 15/06* (2006.01)
*B62M 27/02* (2006.01)
*B62D 21/11* (2006.01)
*B60K 5/12* (2006.01)

(52) U.S. Cl.
CPC ............ *F02N 15/06* (2013.01); *B60K 5/1208* (2013.01); *B62D 21/11* (2013.01); *B62M 27/02* (2013.01); *B60K 5/12* (2013.01); *B62M 2027/023* (2013.01)

(58) Field of Classification Search
CPC ....................................................... F02N 11/00
See application file for complete search history.

(56) References Cited

U.S. PATENT DOCUMENTS

| | | | | |
|---|---|---|---|---|
| 2,094,290 A | * | 9/1937 | Brobson | F02B 75/246 475/198 |
| 2,311,944 A | * | 2/1943 | Jackson | F02N 15/043 290/38 A |
| 2,335,186 A | * | 11/1943 | Jackson | F02B 67/04 123/195 A |
| 2,538,658 A | | 1/1951 | Saurer | |
| 3,730,462 A | | 5/1973 | Dick | |
| 4,240,517 A | | 12/1980 | Harlow, Jr. et al. | |
| 4,456,213 A | | 6/1984 | Fukushima et al. | |
| 4,522,378 A | | 6/1985 | Nelson | |
| 4,718,290 A | * | 1/1988 | Murata | F02N 15/06 74/7 A |
| 4,877,262 A | | 10/1989 | Tanahashi et al. | |

(Continued)

FOREIGN PATENT DOCUMENTS

| | | | | | |
|---|---|---|---|---|---|
| CN | 1249338 C | * | 4/2006 | ............ | F02B 61/02 |
| EP | 1375909 A2 | * | 1/2004 | ............ | F02B 61/02 |
| FR | 2611808 A1 | * | 9/1988 | ............ | F02F 7/0046 |

*Primary Examiner* — Darlene P Condra
(74) *Attorney, Agent, or Firm* — Harness, Dickey & Pierce, P.L.C.

(57) ABSTRACT

An engine is disclosed having a starter clutch ring gear, and a crank case having an integral starter pinion accepting member defining a through bore, and a gear assembly having an exterior surface configured to engage a flywheel and an surface engaging the second of the shaft. A starter pinion shaft is disposed through the through bore. The integral starter pinion accepting member defines a surface coupled to an engine mount.

20 Claims, 13 Drawing Sheets

(56) References Cited

U.S. PATENT DOCUMENTS

| | | | |
|---|---|---|---|
| 5,845,618 A * | 12/1998 | Taue | F02B 75/16 |
| | | | 123/317 |
| 5,992,816 A | 11/1999 | Yoshida et al. | |
| 6,029,942 A | 2/2000 | Daddis, Jr. et al. | |
| 6,302,385 B1 | 10/2001 | Summers, III et al. | |
| 6,565,061 B1 | 5/2003 | Petersen et al. | |
| 6,895,915 B2 * | 5/2005 | Hemphill | F02N 15/023 |
| | | | 29/888.011 |
| 7,216,615 B2 * | 5/2007 | Takano | F02N 15/006 |
| | | | 123/179.25 |
| 7,458,369 B2 * | 12/2008 | Ozawa | F01D 25/20 |
| | | | 123/561 |
| 8,646,761 B2 | 2/2014 | Rodecker | |
| 9,033,320 B2 | 5/2015 | Nakamura et al. | |
| 9,719,570 B2 | 8/2017 | Kojima | |
| 2005/0288151 A1 * | 12/2005 | Yamamoto | F02N 11/103 |
| | | | 477/110 |
| 2006/0090944 A1 * | 5/2006 | Ishida | B62M 7/02 |
| | | | 180/219 |
| 2012/0193852 A1 | 8/2012 | Thye-Moormann | |
| 2013/0187320 A1 | 7/2013 | Henselmeyer | |
| 2013/0285298 A1 | 10/2013 | Nakamura et al. | |
| 2014/0091507 A1 | 4/2014 | Oldfield | |
| 2014/0367547 A1 | 12/2014 | Ohnishi et al. | |
| 2015/0118026 A1 * | 4/2015 | Naruoka | F04D 25/02 |
| | | | 415/123 |
| 2015/0300436 A1 | 10/2015 | Kojima | |
| 2018/0056771 A1 | 3/2018 | Jo | |
| 2018/0058537 A1 | 3/2018 | Yanagida et al. | |
| 2019/0048956 A1 | 2/2019 | Kashihara et al. | |

\* cited by examiner

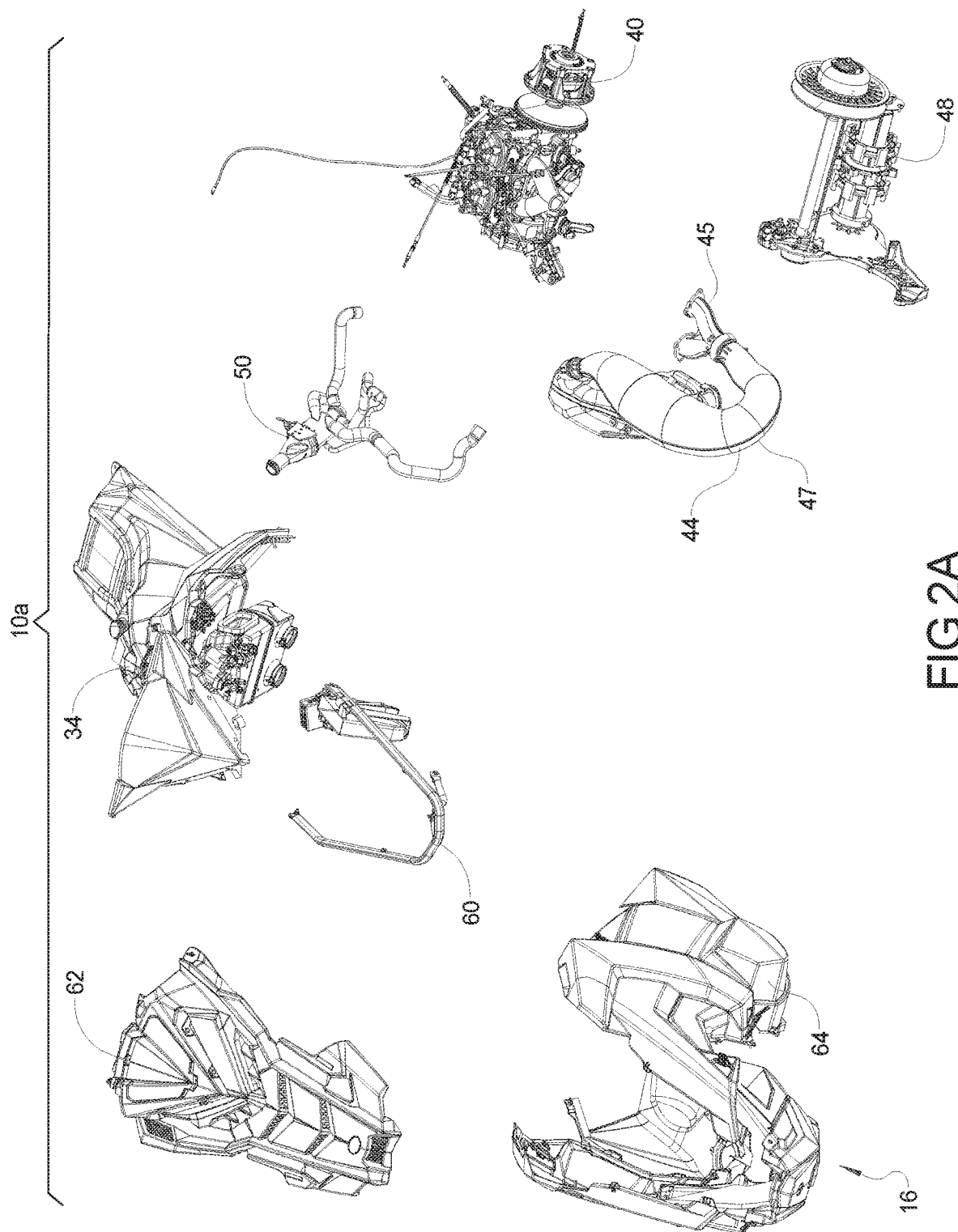

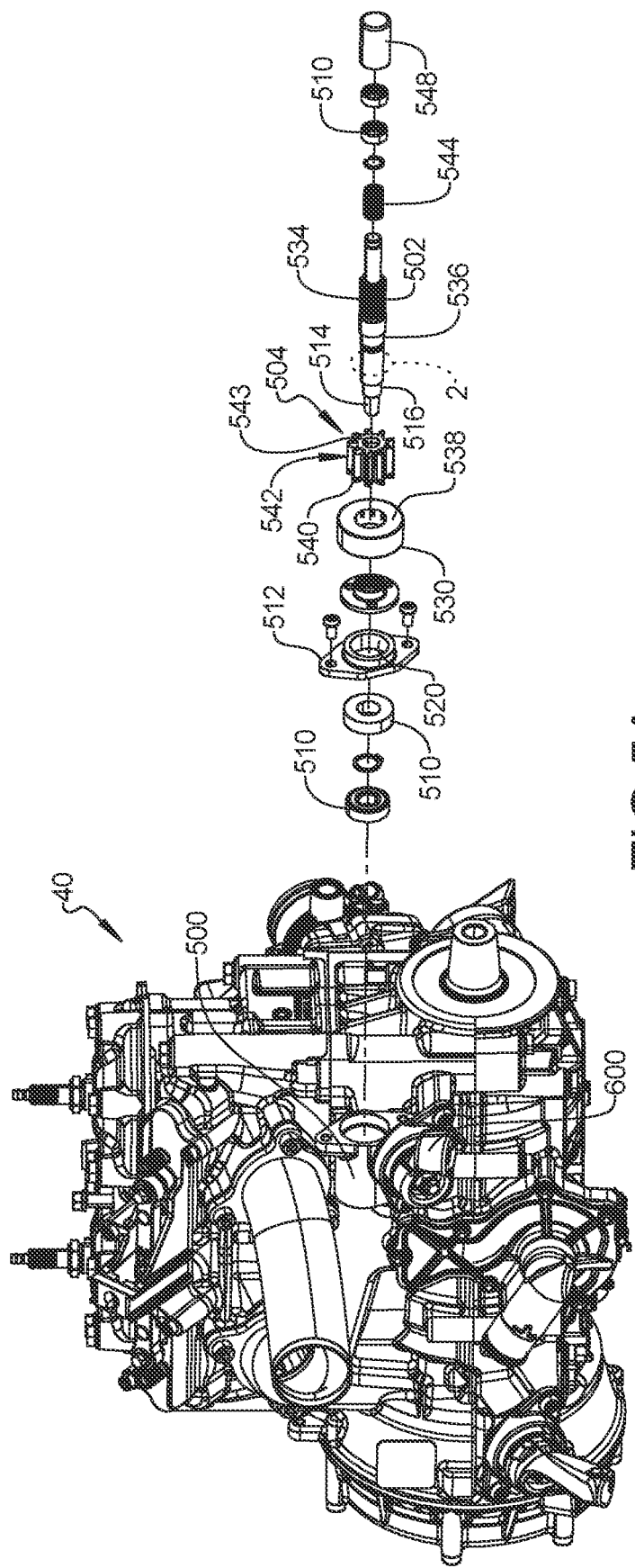

CRANKCASE MOUNTS AND REINFORCED RUBBER IN MOUNT ON FORCE VECTOR

CROSS-REFERENCE TO RELATED APPLICATIONS

This application claims benefit to U.S. application Ser. No. 15/723,884, filed on Oct. 3, 2017, now issued U.S. Pat. No. 10,619,615, entitled "Crankcase Mounts And Reinforced Rubber In Mount On Force Vector." The entire disclosure of the above application is incorporated herein by reference.

FIELD

The present disclosure relates to a vehicle engine and, more particularly, to an engine having an integral starter pinion and engine mount.

BACKGROUND

This section provides background information related to the present disclosure which is not necessarily prior art.

The off road vehicle market is driven by a need for increasing sophistication and performance of vehicles leading to the installation of more sophisticated, more powerful internal combustion engines. The engine and ancillary equipment needs to be accommodated in a limited space, with the result that engine compartments are increasingly crowded and present significant packaging problems. These packaging problems increase complications related to repair as well as subjecting components externally coupled to the engine to increased environmental complications.

Vehicle internal combustion engines are mounted to the vehicle via engine mounts which support the engine as well as limit the transmission of noise, vibration and harshness from the engine to the vehicle structure. Engine mounts use compliant materials suitable for isolating the engine from the vehicle when the engine yet stiff enough to allow better control of the engine when the vehicle is being driven. During startup however, engine mounts may not be properly positioned to overcome startup structural vibration.

Embodiments of the present invention have been made in consideration of these and other problems.

SUMMARY

This section provides a general summary of the disclosure, and is not a comprehensive disclosure of its full scope or all of its features.

According the present teachings, an engine is disclosed having a starter clutch ring gear, and a crank case having an integral starter pinion accepting member defining a through bore, and a gear assembly having an exterior surface configured to engage the starter clutch ring gear and an surface engaging the shaft. A starter pinion shaft is disposed through the through bore, and has a first end projecting from a first side of the integral starter pinion accepting member. The first end is configured to be coupled to a starter motor. The starter pinion shaft has a second end projecting from a second side of the integral starter pinion accepting member, and defines a drive surface supporting the gear assembly. The pinion shaft is supported by a bearing disposed between the shaft and the through bore integral surface.

According to an alternate teaching, the afore mentioned paragraphs or the following paragraphs, the engine further has the second end of the pinion shaft defines a worm gear configured to bias the gear assembly in a first direction when the shaft is rotated.

According to an alternate teaching, the afore mentioned paragraphs or the following paragraphs, the gear assembly has a gear defining an internally threaded bore 543 (FIG. 5A) and an externally threaded surface, the internally threaded bore being configured to engage the worm gear defined on the shaft.

According to an alternate teaching, the afore mentioned paragraphs or the following paragraphs, the gear assembly has a return spring configured to bias the gear assembly exterior surface away from the ring gear when the shaft is not rotating.

According to an alternate teaching, the afore mentioned paragraphs or the following paragraphs, the engine further has a locking flange or member 2 (FIG. 5A) annularly disposed about the shaft configured to couple the shaft to the starter pinion accepting member.

According to an alternate teaching, the afore mentioned paragraphs or the following paragraphs, wherein the shaft has a first end defining a flat configured to engage a flexible drive member.

According to an alternate teaching, the afore mentioned paragraphs or the following paragraphs, wherein the gear assembly has a dust cover disposed over a return spring.

According the present teachings, an engine is disclosed having engine crankcase having an integral starter pinion accepting member defining a through bore and an external bearing surface and a force transmitting member having an exterior fly wheel engaging surface and an interior surface configured a worm gear engaging surface. A shaft which is disposed through the through bore is provided. The shaft has worm gear coupled to the worm gear engaging surface. An engine mount coupled to the external bearing surface.

According to an alternate teaching, the afore mentioned paragraphs or the following paragraphs, the gear assembly has a return spring configured to bias the gear assembly exterior surface away from the ring gear when the shaft is not rotating.

According to an alternate teaching, the afore mentioned paragraphs or the following paragraphs, the engine further has further has a locking flange annularly disposed about the shaft configured to couple the shaft to starter pinion accepting member.

According to an alternate teaching, the afore mentioned paragraphs or the following paragraphs, the gear assembly has a dust cover disposed over a return spring.

According to an alternate teaching, the afore mentioned paragraphs or the following paragraphs, the engine mount has a cylindrical rubber bushing member and a support bracket having a raised lip which annularly surrounds a cylindrical rubber bushing member.

According to an alternate teaching, the afore mentioned paragraphs or the following paragraphs, the engine further has the engine mount bracket has a threaded pin disposed through the rubber bushing which is used to couple the engine mount to the vehicle frame engaging member.

According to an alternate teaching, the afore mentioned paragraphs or the following paragraphs, the rubber bushing member has an integrated plate member, the plate and bushing member each having a pair of projecting flanges which are aligned with a pair of flange accepting apertures defined in the vehicle frame engaging member.

According the present teachings, an engine mount is disclosed having a cylindrical rubber bushing member having a first pair of projecting flanges. The engine mount has an integrated plate member having a second pair of projecting flanges, the integrated plate member being at least partially disposed within the cylindrical rubber bushing member. A support bracket having a raised lip annularly surrounding the cylindrical rubber bushing member.

According to an alternate teaching, the afore mentioned paragraphs or the following paragraphs, the engine mount bracket has a threaded pin disposed through the rubber bushing which is used to couple the engine mount to the vehicle frame engaging member.

According to an alternate teaching, the afore mentioned paragraphs or the following paragraphs, the second pair of projecting flanges are at least partially disposed within the first pair of projecting flanges, wherein at least one of the first or second projecting flanges are aligned with a pair of flange accepting apertures defined in the vehicle frame.

According to an alternate teaching, the afore mentioned paragraphs, the first a pair of projecting flanges are positioned on a first surface of the rubber member and are radially displaced from each other between 10 and 180 degrees about a rubber bushing periphery.

DRAWINGS

The drawings described herein are for illustrative purposes only of selected embodiments and not all possible implementations, and are not intended to limit the scope of the present disclosure.

FIG. 1 is a perspective view of a snowmobile.

FIGS. 2-2 B are exploded views of the snowmobile of FIG. 1.

FIGS. 5A-5C are views of an engine components of an integral starter pinion and engine mount.

Corresponding reference numerals indicate corresponding parts throughout the several views of the drawings.

DETAILED DESCRIPTION

Example embodiments will now be described more fully with reference to the accompanying drawings. Although the following description includes several examples of a snowmobile application, it is understood that the features herein may be applied to any appropriate vehicle, such as, all-terrain vehicles, utility vehicles, moped and scooters. The examples disclosed below are not intended to be exhaustive or to limit the disclosure to the precise forms disclosed in the following detailed description. Rather, the examples are chosen and described so that others skilled in the art may utilize their teachings.

Figure 1:
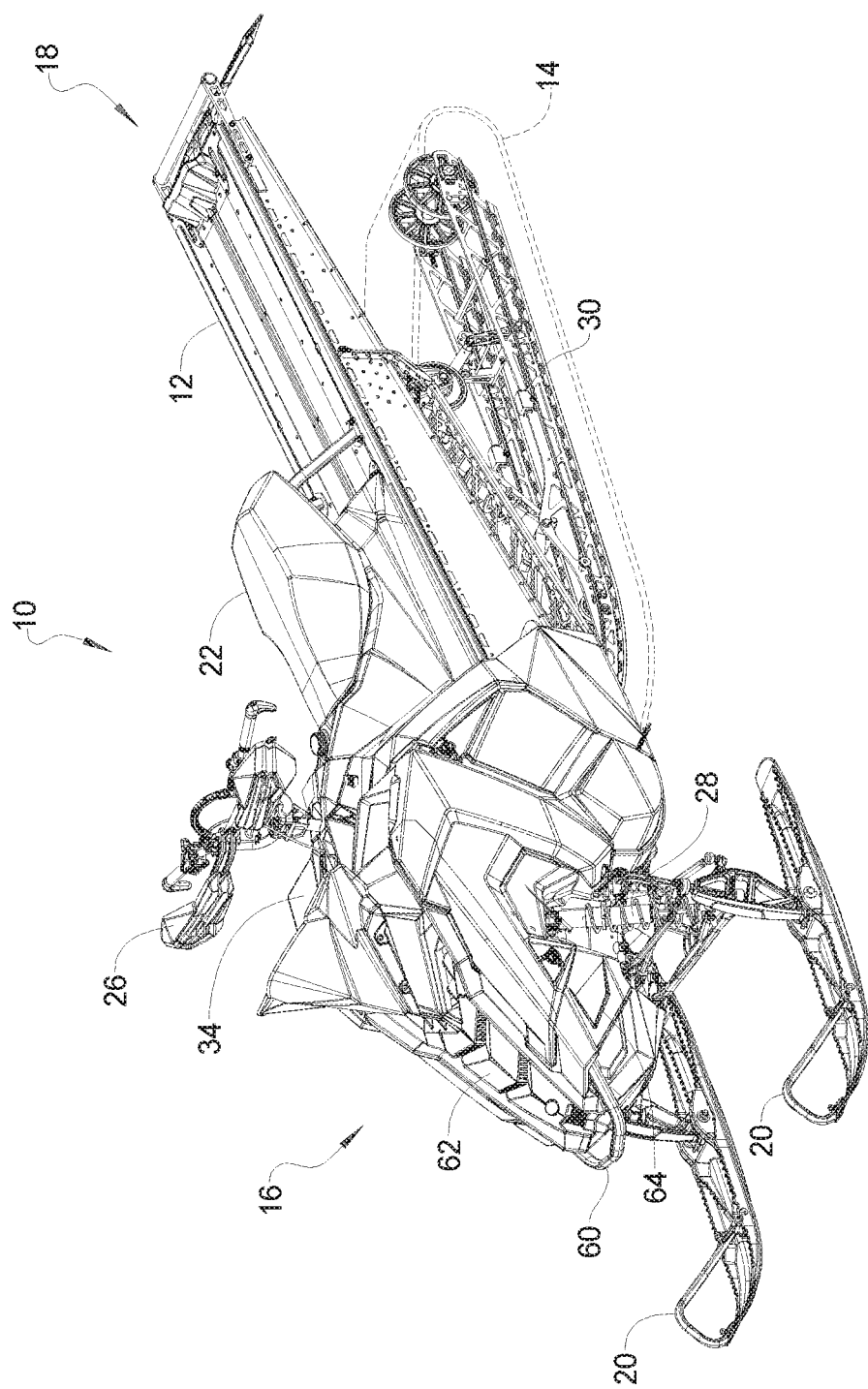
Figure 2:
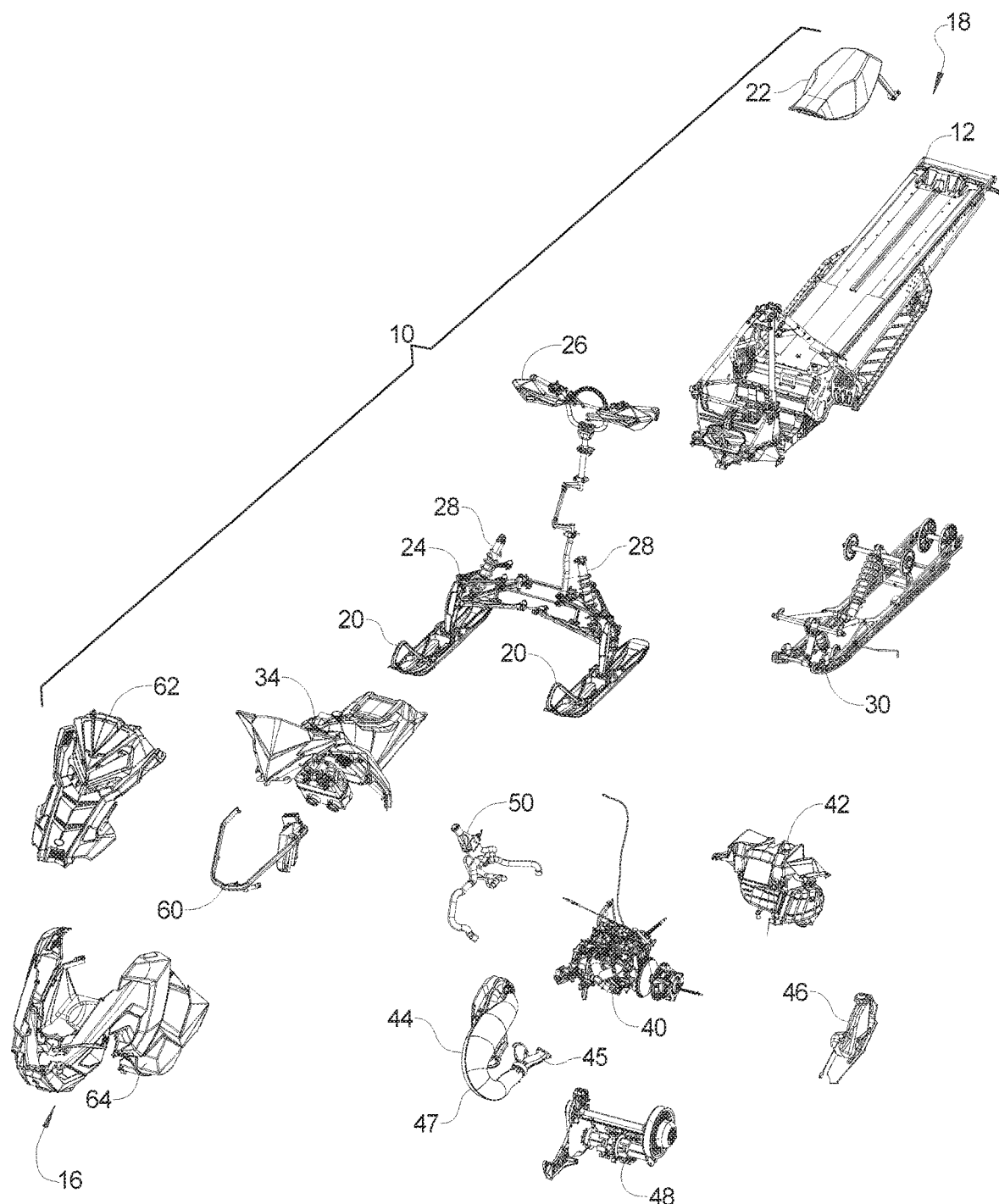
Figure 2B:
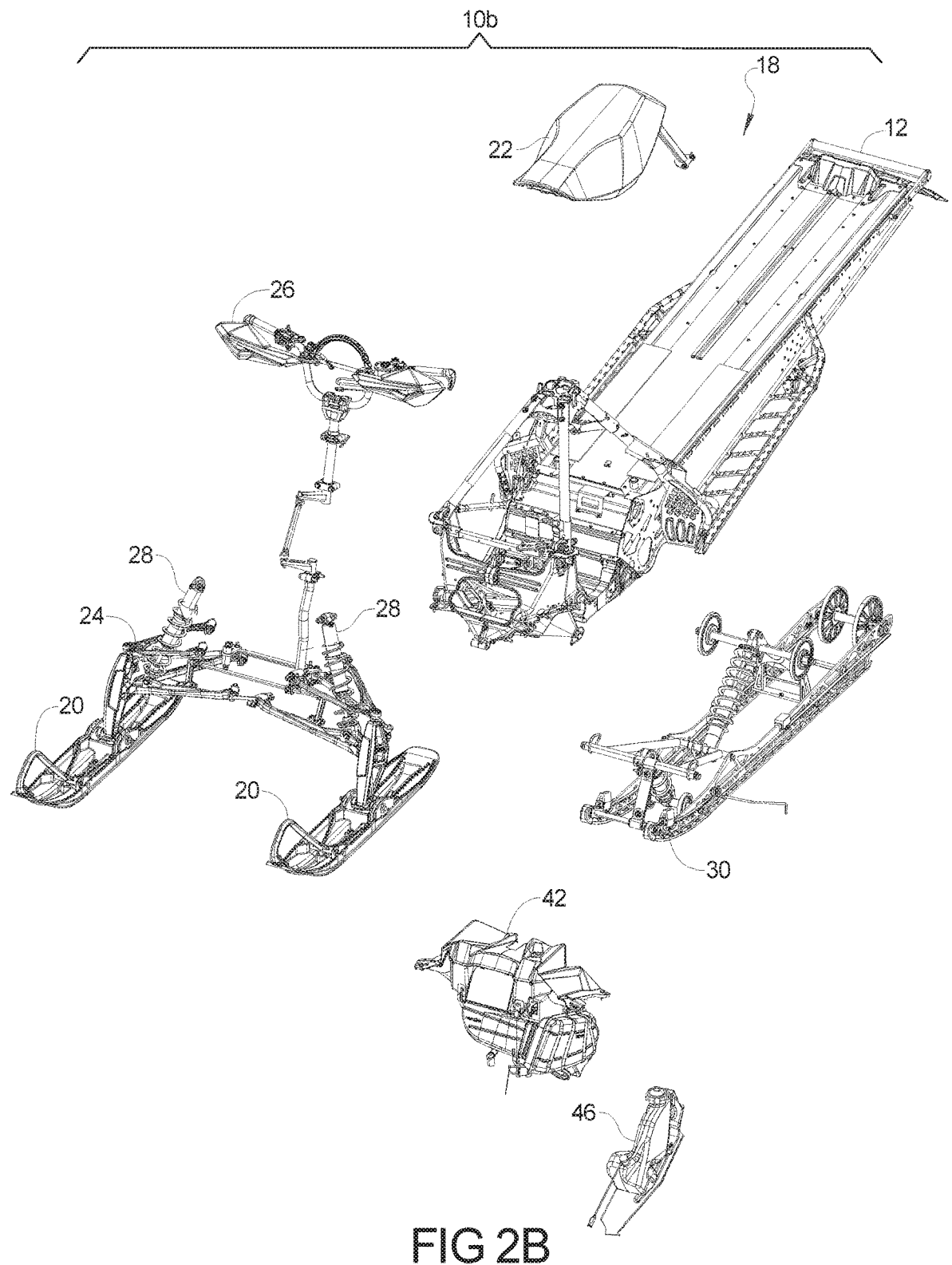

Referring now to FIGS. 1-2B, one embodiment of an exemplary snowmobile 10, 10a, 10b is shown. Snowmobile 10 includes a chassis 12, an endless belt assembly 14, and a pair of front skis 20. Snowmobile 10 also includes a front-end 16 and a rear-end 18.

The snowmobile 10 also includes a seat assembly 22 that is coupled to the chassis assembly 12. A front suspension assembly 24 is also coupled to the chassis assembly 12. The front suspension assembly 24 may include a steering wheel 26, shock absorbers 28 and the skis 20. A rear suspension assembly 30 is also coupled to the chassis assembly 12. The rear suspension assembly 30 may be used to support the endless belt 14 for propelling the vehicle. An electrical console assembly 34 is also coupled to the chassis assembly 12. The electrical console assembly 34 may include various components for electrically controlling the snowmobile 10.

The snowmobile 10 also includes an engine assembly 40. The engine assembly 40 is coupled to an intake assembly 42 and an exhaust assembly 44. The intake assembly 42 is used for providing fuel and air into the engine assembly 40 for the combustion process. Exhaust gas leaves the engine assembly 40 through the exhaust assembly 44. An oil tank assembly 46 is used for providing oil to the engine for lubrication and for mixing with the fuel in the intake assembly 42. A drivetrain assembly 48 is used for converting the rotating crankshaft assembly from the engine assembly 40 into a force to use the endless belt 14 and thus the snowmobile 10. The engine assembly 40 is also coupled to a cooling assembly 50.

The chassis assembly 12 may also include a bumper assembly 60, a hood assembly 62 and a nose pan assembly 64. The hood assembly 62 is movable to allow access to the engine assembly 40 and its associated components.

Figure 3A:
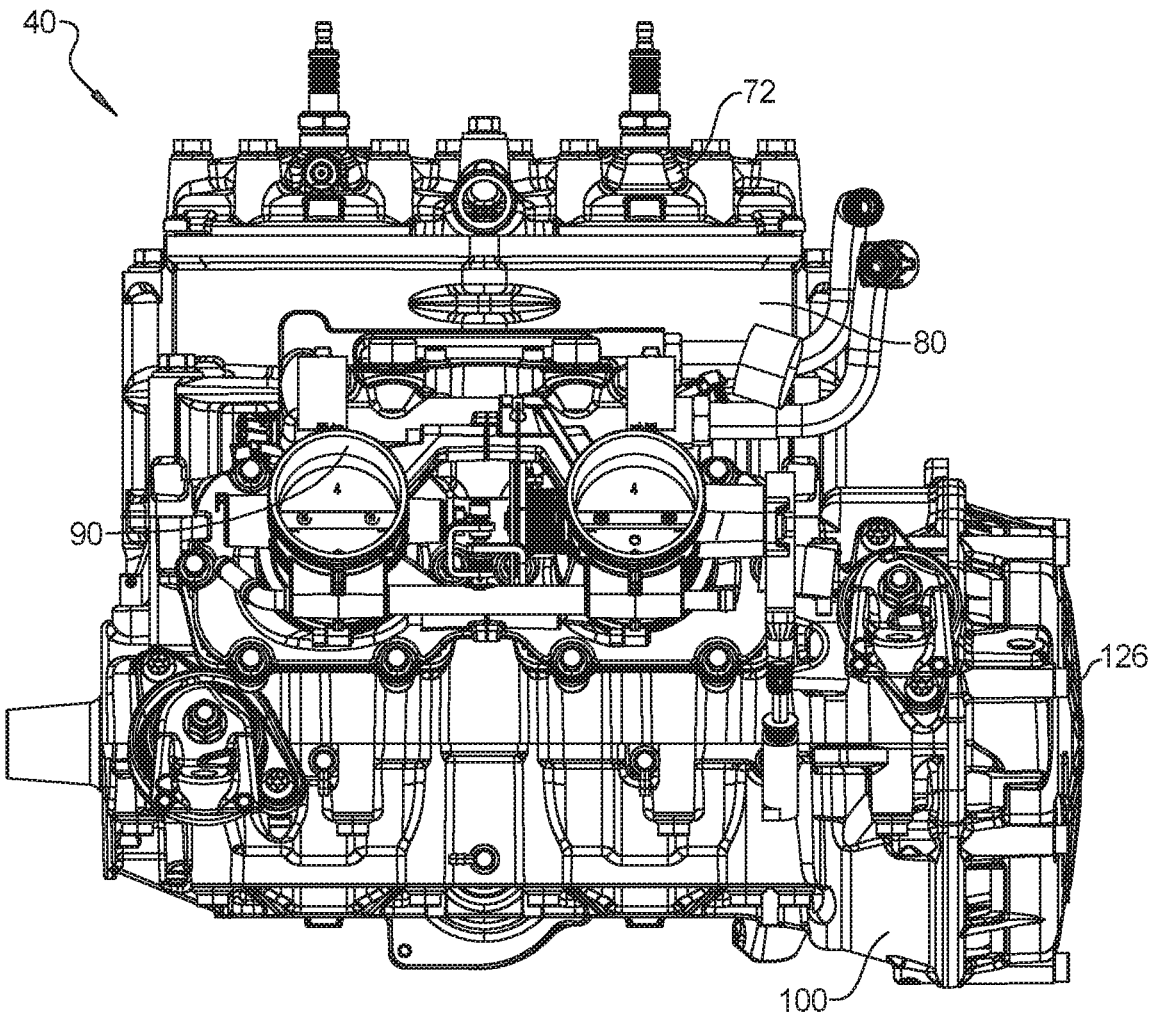
FIGS. 3A and 3B are opposite side views of the engine of FIG. 2.
Figure 3B:
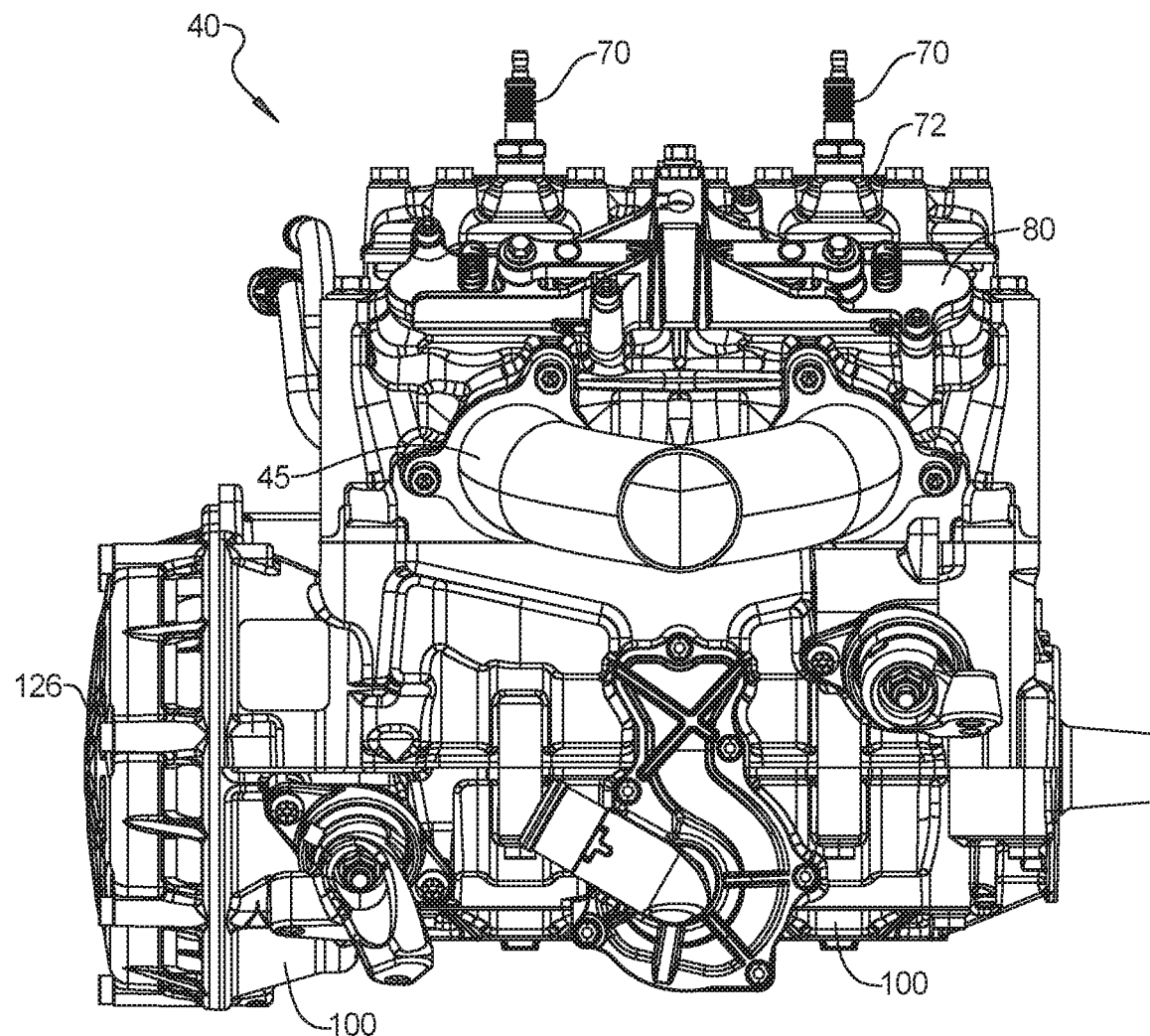
Figure 4:
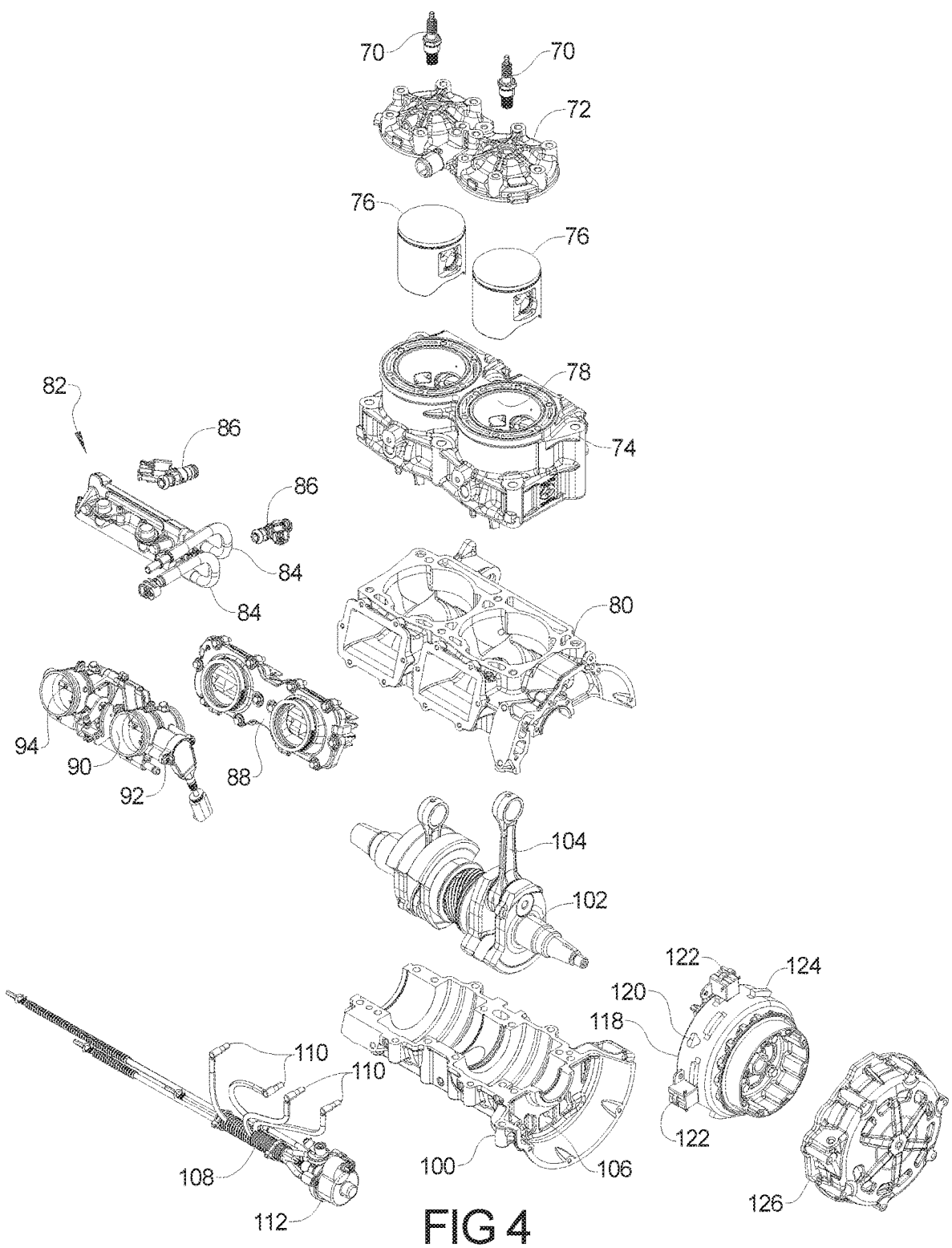
FIG. 4 is an exploded view of the engine of FIG. 3A.

Referring now to FIGS. 3A, 3B and 4, the engine assembly 40 is illustrated in further detail. The engine assembly 40 is a two-stroke engine that includes the exhaust assembly 44 which may be referred to as an exhaust manifold. The exhaust assembly 44 includes connection portions 45 and a main pipe 47.

The engine assembly 40 may include spark plugs 70 which are coupled to a cylinder head cover 72. The cylinder head cover 72 is coupled to the cylinder head 74 which is used for housing the pistons 76 to form a combustion chamber 78 therein. The cylinder head 74 is mounted to the engine block 80.

The fuel system 82 includes fuel lines 84 and fuel injectors 86. The fuel lines 84 provide fuel to the fuel injectors 86 which inject fuel, in this case, into a port adjacent to the pistons 76. An intake manifold 88 is coupled to the engine block 80. The intake manifold 88 is in fluidic communication with the throttle body 90. Air is air for the combustion processes admitted into the engine through the throttle body 90 which may be controlled directly through the use of an accelerator pedal or hand operated switch. A throttle position sensor 92 is coupled to the throttle to provide a throttle position signal corresponding to the position of a throttle valve of throttle plate 94 to an engine controller.

The engine block 80 is coupled to crankcase 100 and forms a cavity for housing the crankshaft 102. The crankshaft 102 has connecting rods 104 which are ultimately coupled to the pistons 76. The movement of the pistons 76 within the engine chamber 78 causes a rotational movement at the crankshaft 102 by way of the connecting rods 104. The crankcase may have openings or vents 106 therethrough. The system is lubricated using oil lines 108 which are coupled to the oil injectors 110 and an oil pump 112.

The crankshaft 102 is coupled to the flywheel 118 and having a stator 120 therein. The flywheel 118 has crankshaft position sensors 122 that aid in determining the positioning of the crankshaft 102. The crankshaft position sensors 122 are aligned with the teeth 124 and are used when starting the engine as well as being used to time the operation of the injection of fuel during the combustion process. A stator cover 126 covers the stator 120 and flywheel 118.

Figure 5B:
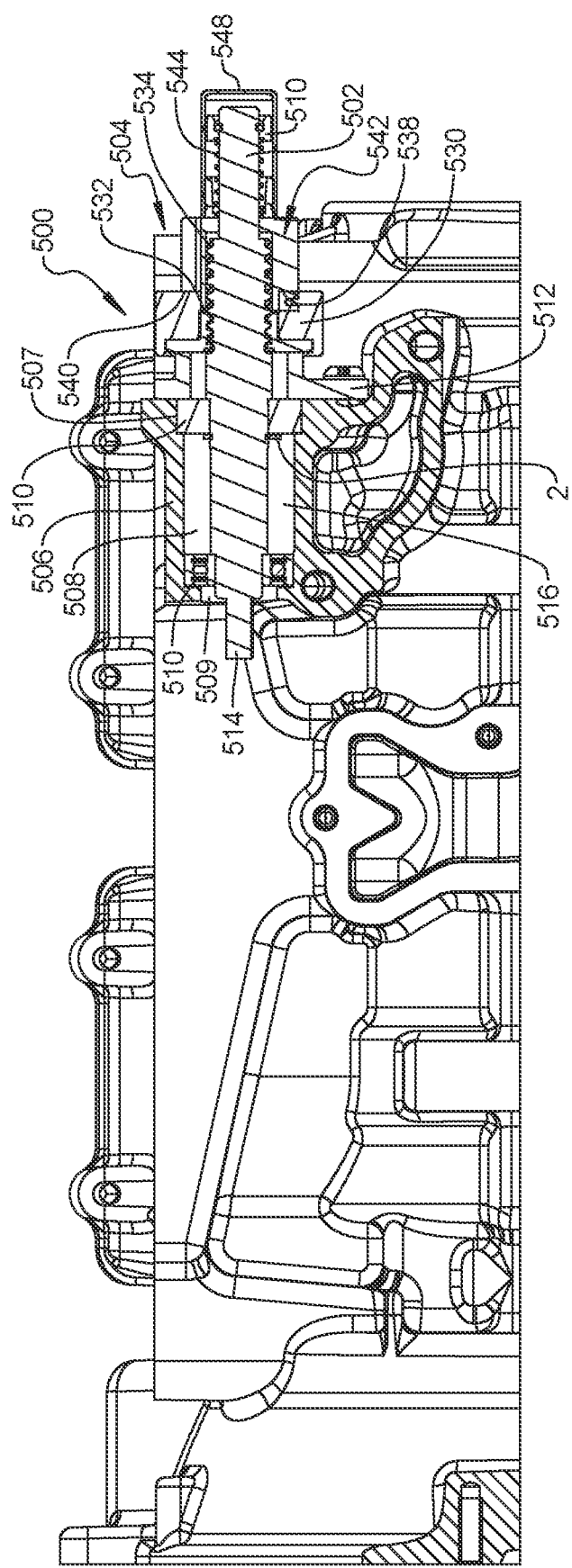
Figure 5C:
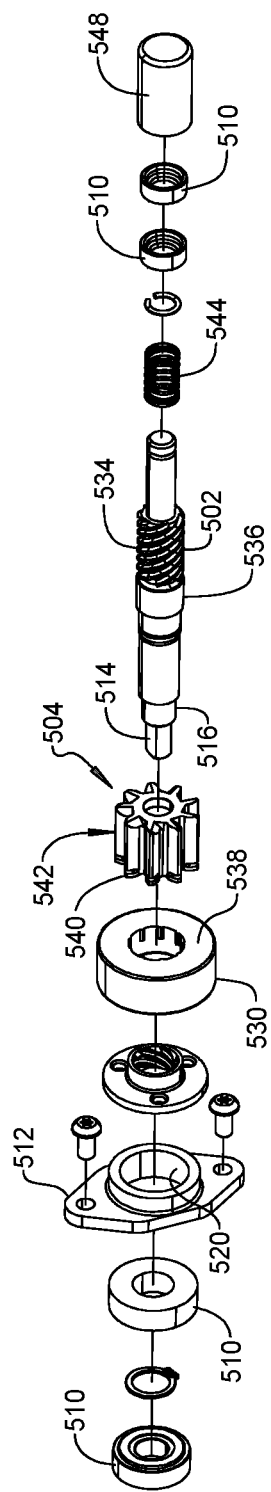

As best seen in FIGS. 5A-5C, the engine assembly 40 has a starter pinion assembly 500 having an integrated engine mount 600 which may accept a linear drive including a pinion shaft 502. The starter pinion assembly 500 has the pinion shaft 502 having a displaceable gear assembly 504 having an exterior surface configured to engage a ring gear 503 on a clutch. The starter pinion assembly 500, has an integrated monolithic starter pinion support member 506 that is cast and machined into the crankshaft case body.

FIGS. 5B and 5C represent sectional and exploded views of the pinion assembly 500. The starter pinion assembly 500 is integral formed into the crankcase at the integrated starter pinion support member 506. The integral starter pinion accepting member 506 defines a through bore 508 which annually supports the shaft 502 using a pair of bearings 510. The integral starter pinion accepting member 506 has first and second ends defining first and second apertures 507 and 509, with first aperture 507 having a larger diameter than the second aperture 509. The shaft 502 and displaceable gear assembly 504 are held to the integral starter pinion member 506 by a bracket 512 which defines a through aperture annularly disposed about the shaft 502. The shaft 502 has a first end 514 which projects from a first end of the integral starter pinion accepting member 506 and through the aperture 508. The first end 514 has an engaging surface which allows the coupling of the shaft 502 to a flexible starter cable (not shown).

The shaft 502 further has a medial portion 516 which is annularly supported by the bearings 510. The bracket 512 defines a through bore 520 which is annularly disposed about the shaft 502, and functions to hold the bearings 510 within the through aperture 508.

Outside of the through aperture 508 is the displaceable gear assembly 504. The displaceable gear assembly 504 has a shaft engaging member 530 which has an interior thread 532 that engages a worm thread 534 defined on an exterior surface 536 on the shaft 502. The shaft engaging member 530 has a surface 538 which apply axial force onto a surface 540 of a gear 542 which during engagement of the starter axially displaces the gear 542 along a longitudinal axis of the shaft into engagement with the ring gear 503.

After the starter is disengaged, power to the displaceable gear assembly 504 is removed, stopping rotation of the shaft 502. Return spring 544 applies return axial forces to the gear 542, disengaging the gear 542 from the ring gear 503. Associated with the return spring is a pair of bearings 510 and a dust cover 548.

Figure 6A:
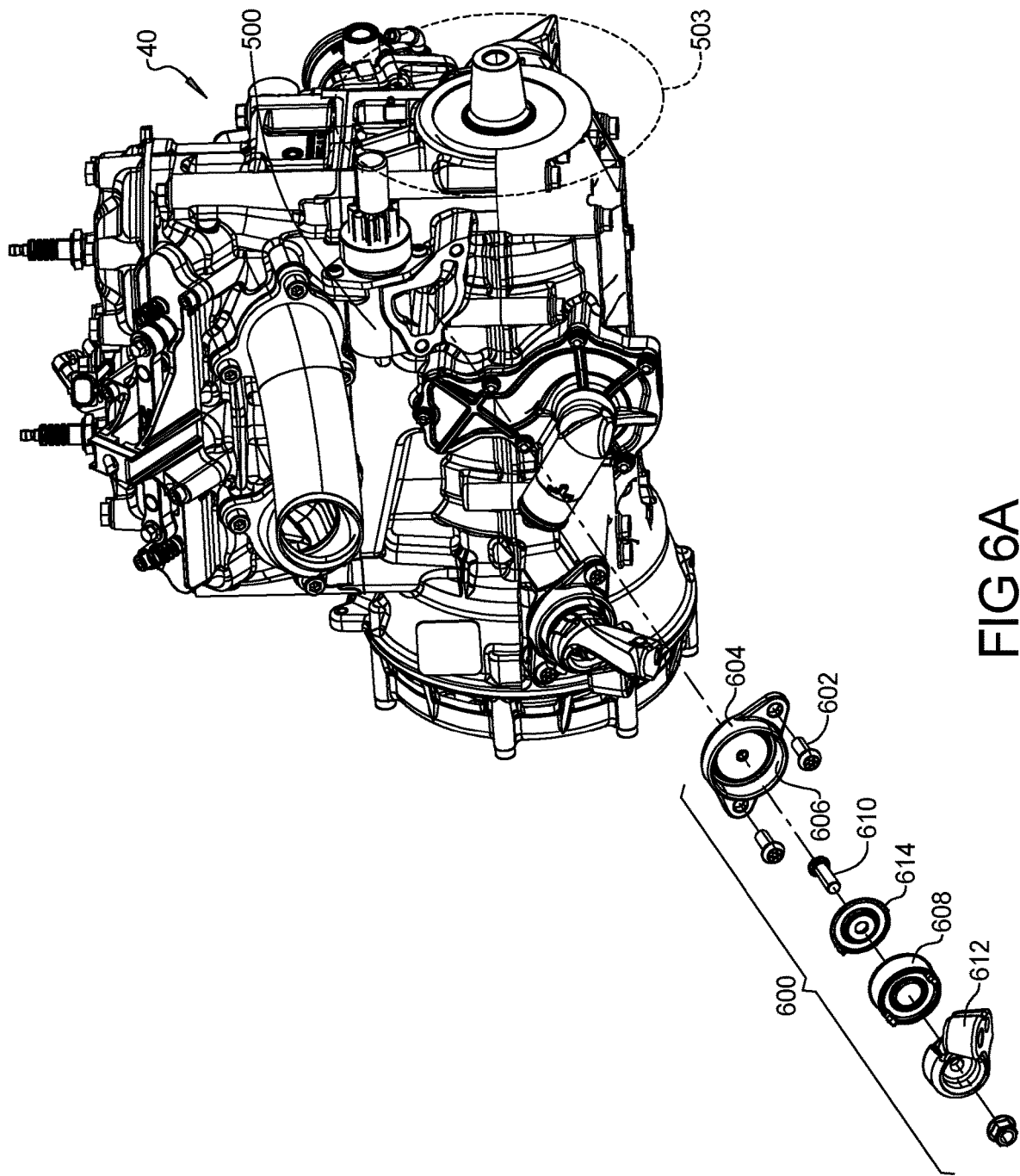
FIGS. 6A and 6B represent sectional and exploded views of the integral starter pinion and engine mount shown in FIG. 5A.
Figure 6B:
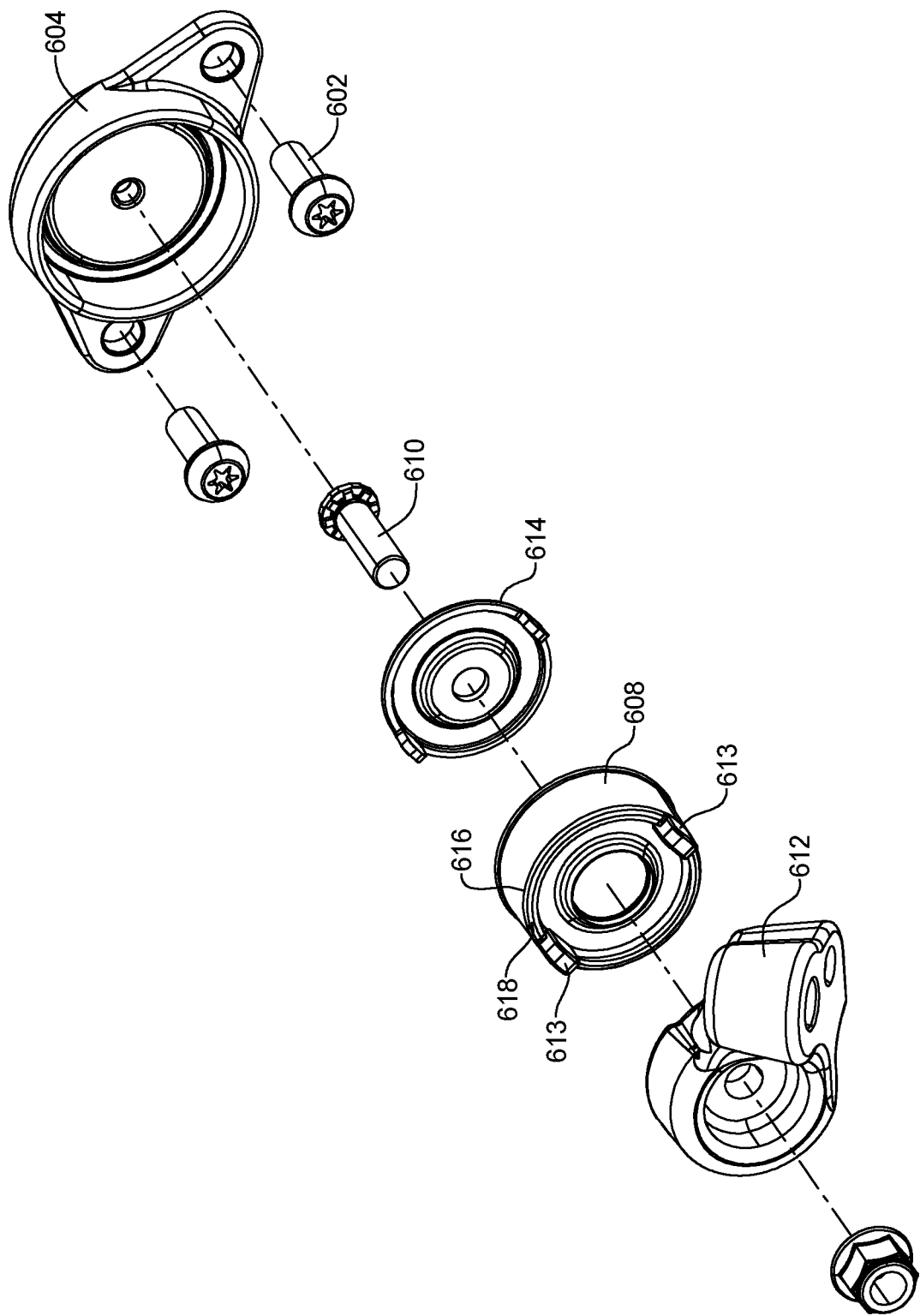

As best seen in FIGS. 6A-6B, immediately adjacent the starter pinion assembly 500 and coupled thereto is the engine mount 600. The engine mount 600 is coupled to the integral starter pinion accepting member 506 with a pair of fasteners 602.

In this regard, the engine mount 600 has a bracket 604 having a raised lip 606 which annularly surrounds a cylindrical rubber bushing member 608. Disposed through the bracket 604 and cylindrical rubber bushing member 608 is a threaded pin 610 which is used to couple the engine mount 600 to a vehicle from engaging member 612.

Figure 7A:
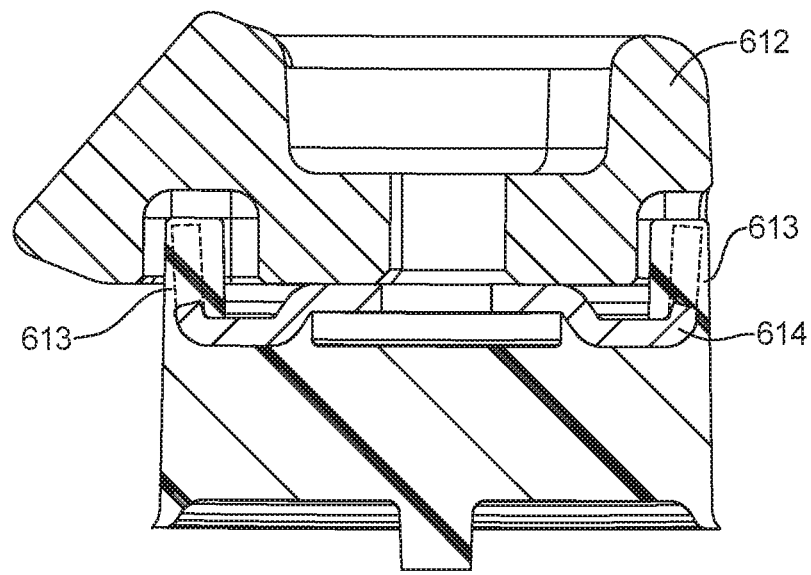
FIGS. 7A and 7B represent sectional and perspective views of the Engine mount according to the present teachings.
Figure 7B:
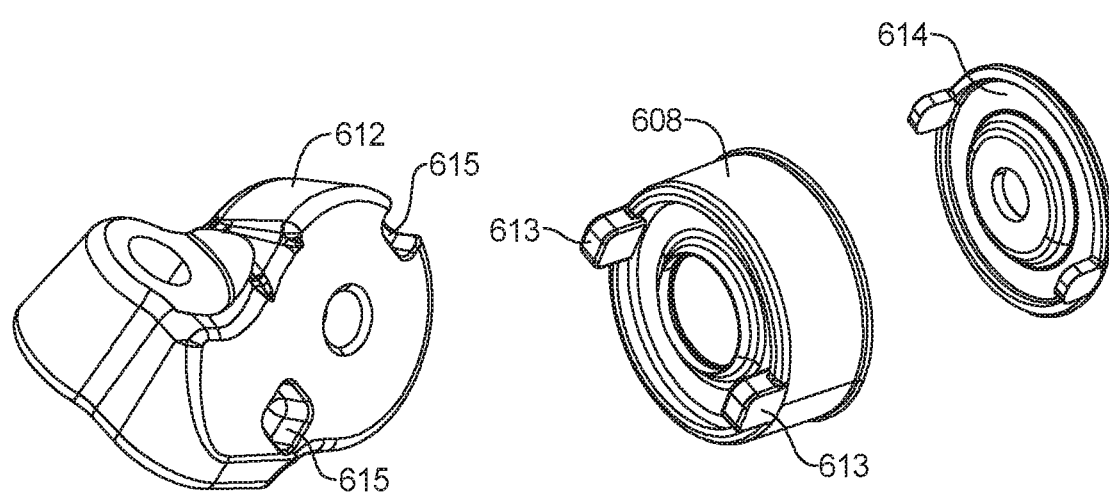

As best seen in FIGS. 7A and 7B, the rubber bushing member 608 has an integrated plate member 614. The integrated plate member 614 and bushing member 608 have a pair of projecting ears or flanges 613 disposed at the bushing periphery 616 and off of a bushing top surface 618 which are aligned with a pair of square flange accepting apertures 614 defined in the vehicle frame engaging member 612. The pair of projecting ears or flanges 613 disposed at the bushing periphery 616 and off of a bushing top surface 618 project along a line parallel to and displaced from an axis formed by the support pin. The pair of projecting ears or flanges 613 function as additional cushion and support along the force vectors most likely to induce damage to the bushing material. These apertures 615 and flanges align with the highest vibration loading vectors in the vehicle, thus increasing the expected life of the rubber bushing member 608. In this regard, the pair of projecting flanges are positioned on a first surface of the rubber member and are radially displaced about a rubber bushing periphery at between 10 and 180 degrees to accept loading.

Examples are provided so that this disclosure will be thorough, and will fully convey the scope to those who are skilled in the art. Numerous specific details are set forth such as examples of specific components, devices, and methods, to provide a thorough understanding of examples of the present disclosure. It will be apparent to those skilled in the art that specific details need not be employed, that examples may be embodied in many different forms and that neither should be construed to limit the scope of the disclosure. In some examples, well-known processes, well-known device structures, and well-known technologies are not described in detail.

The foregoing description has been provided for purposes of illustration and description. It is not intended to be exhaustive or to limit the disclosure. Individual elements or features of a particular example are generally not limited to that particular example, but, where applicable, are interchangeable and can be used in a selected example, even if not specifically shown or described. The same may also be varied in many ways. Such variations are not to be regarded as a departure from the disclosure, and all such modifications are intended to be included within the scope of the disclosure.

What is claimed is:

1. An engine comprising:
   a clutch ring gear;
   a crank case having an integral starter pinion accepting member defining a through bore, the through bore having a through bore interior surface;
   a gear assembly having a first fear assembly surface configured to engage the clutch ring gear and a second gear assembly surface configured to engage a linear drive; and
   a starter pinion shaft disposed through the through bore, the starter pinion shaft having a first end projecting from a first side of the integral starter pinion accepting member and being configured to be coupled to a starter motor, the starter pinion shaft having a second end projecting from a second side of the integral starter pinion accepting member, the second end defining the linear drive supporting the gear assembly, the starter pinion shaft being supported by a bearing disposed between the starter pinion shaft and the through bore internal surface.

2. The engine of claim 1 wherein the second end defines a worm gear configured to bias the gear assembly in a first direction when the shaft is rotated.

3. The engine of claim 2 wherein the gear assembly has a gear defining an internally threaded bore and an externally threaded surface, the internally threaded bore being configured to engage the worm gear defined on the starter pinion shaft.

4. The engine of claim 1 wherein the gear assembly comprises a return spring configured to bias the first gear assembly surface away from the ring gear when the shaft is not rotating.

5. The engine of claim 1 further comprising:
a locking member annularly disposed about the shaft configured to couple the shaft to starter pinion accepting member.

6. The engine of claim 1 wherein the first end defines a surface having a flat configured to engage a flexible drive member.

7. The engine of claim 1 wherein the gear assembly has a dust cover disposed over a return spring.

8. The engine claim 1 wherein the gear assembly has a gear assembly bearing configured to support the gear assembly on the starter pinion shaft.

9. An engine comprising:
an integral starter pinion accepting member defining a through bore and an external bearing surface, a pinion having a linear drive;
a gear assembly having a clutch ring gear engaging surface and an interior surface configured to couple to the linear drive; and
an engine mount coupled to the external bearing surface.

10. The engine of claim 9 wherein the gear assembly defines an internally threaded bore and an externally threaded surface, the internally threaded bore being configured to engage the linear drive, the linear drive being configured to bias the gear assembly exterior surface toward the ring gear when a shaft of the pinion is rotated.

11. The engine of claim 9 wherein the gear assembly comprises a return spring configured to bias the gear assembly exterior surface away from the ring gear when a shaft of the pinion is not rotating.

12. The engine of claim 9 further comprising a locking flange annularly disposed about a shaft of the pinion configured to couple the shaft to the starter pinion accepting member.

13. The engine of claim 9 wherein a shaft of the pinion has a first end that has a surface with a flat configured to engage a flexible drive member.

14. The engaging of claim 9 wherein the gear assembly has a dust cover disposed over a return spring.

15. An engine comprising:
a crank case having a through bore, the through bore defining a through bore interior surface;
a gear assembly having an exterior surface configured to engage a clutch ring gear and a surface configured to engage a linear drive; and
a starter pinion shaft disposed through the through bore.

16. The engine of claim 15, further comprising:
the clutch ring gear;
wherein the shaft has a first end projecting from a first side of the through bore and being configured to be coupled to a starter motor, the shaft has a second end projecting from a second side of the through bore, the second end defining a linear drive surface supporting the gear assembly.

17. The engine of claim 16, wherein the second end defines a worm gear configured to bias the gear assembly in a first direction when the shaft is rotated.

18. The engine of claim 15, further comprising:
a bearing disposed between the starter pinion shaft and the through bore internal surface;
wherein the pinion shaft is supported by the bearing.

19. The engine of claim 15, further comprising:
an integral starter pinion accepting member defining the through bore.

20. The engine of claim 19, further comprising:
an engine mount coupled to an external bearing surface defined by the integral starter pinion accepting member.

* * * * *